(12) United States Patent
Petty

(10) Patent No.: US 7,990,119 B2
(45) Date of Patent: Aug. 2, 2011

(54) MULTIMODE VOLTAGE REGULATOR CIRCUIT

(75) Inventor: John Stewart Petty, Chapel Hill, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 440 days.

(21) Appl. No.: 12/181,739

(22) Filed: Jul. 29, 2008

(65) Prior Publication Data

US 2010/0026250 A1 Feb. 4, 2010

(51) Int. Cl.
*G05F 1/40* (2006.01)
(52) U.S. Cl. .......................... 323/273; 323/282; 323/268
(58) Field of Classification Search .................. 323/225, 323/226, 273, 274, 282, 284
See application file for complete search history.

(56) References Cited

U.S. PATENT DOCUMENTS

| 6,424,128 | B1 | | 7/2002 | Hiraki et al. |
| 6,737,839 | B2 | | 5/2004 | Hiraki et al. |
| 6,836,417 | B2 | | 12/2004 | Hiraki et al. |
| 6,897,715 | B2 | | 5/2005 | Barber, Jr. et al. |
| 6,943,514 | B1 | * | 9/2005 | Chen et al. ............... 318/400.29 |
| 7,498,769 | B1 | * | 3/2009 | Potanin et al. ................ 320/125 |
| 7,609,039 | B2 | * | 10/2009 | Hasegawa ..................... 323/273 |

* cited by examiner

*Primary Examiner* — Jessica Han

(57) ABSTRACT

A multimode voltage regulator circuit includes a linear regulator sub-circuit configured to supply current to a load in a low-current mode, responsive to a first control signal from a first control path, as well as a switching regulator sub-circuit configured to supply current to the load in a high-current mode, responsive to a second control signal from a second control path. The circuit further comprises a shared error amplifier configured to generate an error signal based on the difference between a reference voltage and a feedback signal coupled from the load, and a switch configured to selectively route the error signal to the first control path in the low-current mode and to the second control path in the high-current mode.

14 Claims, 5 Drawing Sheets

MULTIMODE VOLTAGE REGULATOR CIRCUIT

The present invention generally relates to voltage regulator circuits and particularly relates to a multimode voltage regulator having low-current and high-current modes.

BACKGROUND

Voltage regulators are used to convert a supply voltage from one value to a different value, frequently from a high voltage to a lower voltage. In some applications, voltage regulators are used to provide current to a load at a stable voltage, despite a varying supply voltage, such as from a battery. In other applications, a voltage regulator may be used primarily for converting an input supply voltage to an operating voltage that is more convenient or more efficient for a particular circuit. In some applications, both of these functions may be important. For example, the battery voltage in some mobile phones is nominally 3.6 volts, but varies considerably as the battery discharges. Some of the integrated circuits within the mobile phone are designed to operate at voltages as low as 1.0 volts, to minimize power consumption. These mobile phones typically include several voltage regulators to supply stable operating voltages for several distinct circuits operating at different voltages. These regulators are generally required to provide a constant output voltage regardless of whether the input voltage or the load current varies.

Two well known types of step-down regulators are the "linear" regulator and the switching regulator in the form of a "buck" regulator. Either of these types may be configured to provide a constant output voltage over a pre-determined range of input voltage variation and/or load current variation. A linear regulator includes an active pass device, such as a field-effect transistor or bipolar transistor, operated in its "linear," or "ohmic" region. Effectively, the pass device is controlled, using feedback from the regulator output, to act as a variable resistance, so that the output voltage is maintained at a desired level, regardless of variation in the load current or in the input supply voltage.

A buck regulator, on the other hand, relies on the energy storage capability of an inductor to convert an input supply voltage to a regulated output voltage. When a switching transistor is switched "on," current flows into an inductor connected between the input supply voltage and the load, and energy is stored in the inductor. When the switching transistor is turned off and a rectifying transistor between the inductor and ground is turned on, current continues to flow into the load as the inductor's magnetic field releases its energy. Feedback from the regulator output is used to adjust the on/off duty cycle of the two transistors, the on/off switching frequency, or both.

Those skilled in the art are aware that linear regulators are inherently inefficient at high load currents because of the resistive voltage drop across the pass device. The power dissipated in the pass device, and thus wasted, is linear with load current. However, the control circuitry for a linear regulator can be quite simple and can be designed to operate with very low power consumption. Thus, the absolute value of the wasted energy can approach zero as the load current requirements become very low. Buck regulators, on the other hand, can be much more efficient than linear regulators at high load currents, but tend to be inefficient at low load currents. The low-current efficiency of buck regulators (and switching regulators in general) is limited by losses in the switching and rectifier transistors, and because the control circuitry is more complex and consumes more power than that of a linear regulator.

In a modern mobile phone, the output current required to supply the phone's microprocessor circuits might vary from roughly 1 ampere when the phone is performing a processor-intensive task, such as processing high-quality graphics, to roughly 50 microamperes when the phone is in a "sleep" mode. In sleep mode, the mobile phone's processor may be doing nothing more than running a timer that periodically wakes the mobile phone to monitor a radio channel for incoming messages. Given such a wide range of load current, a linear regulator will be less efficient than a buck regulator when the regulator's output current is high, while a buck regulator will be less efficient than a linear regulator during the long periods when the phone is powered on but inactive. Since battery life of mobile phones and other portable devices is critically important to customers, improving that battery life is important to device designers.

SUMMARY

Combining a switching regulator, for use when a required load current is high, with a linear regulator, for use when the load current is low, results in higher efficiency for all load currents than can be achieved by either the switching regulator or linear regulator alone. The disclosed multimode voltage regulators may be especially attractive for use in devices such as mobile phones, in which long periods of very low current use are interspersed with periods of high current use. In certain embodiments, a switching regulator can be modified to form a multimode voltage regulator with only a few additional components.

In an exemplary embodiment, a multimode voltage regulator circuit includes a linear regulator sub-circuit configured to supply current to a load in a low-current mode, responsive to a first control signal from a first control path, as well as a switching regulator sub-circuit configured to supply current to the load in a high-current mode, responsive to a second control signal from a second control path. The circuit further comprises a shared error amplifier configured to generate an error signal based on the difference between a reference voltage and a feedback signal coupled from the load, and a switch configured to selectively route the error signal to the first control path in the low-current mode and to the second control path in the high-current mode.

In some embodiments, the multimode voltage regulator circuit is implemented as a monolithic integrated circuit, perhaps requiring an external inductor and/or external filter capacitor, while in others the regulator circuit is implemented with discrete devices or a combination of discrete devices and one or more integrated circuits. In some embodiments, the linear regulator sub-circuit and the switching regulator sub-circuit share a transistor, so that the shared transistor operates as a variable-resistance pass transistor in the low-current mode and as a low-on-resistance switching transistor in the high-current mode. Sharing components, such as the error amplifier and the shared transistor, between the low-current and high-current operating modes reduces the size and/or cost of the multimode regulator circuit.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
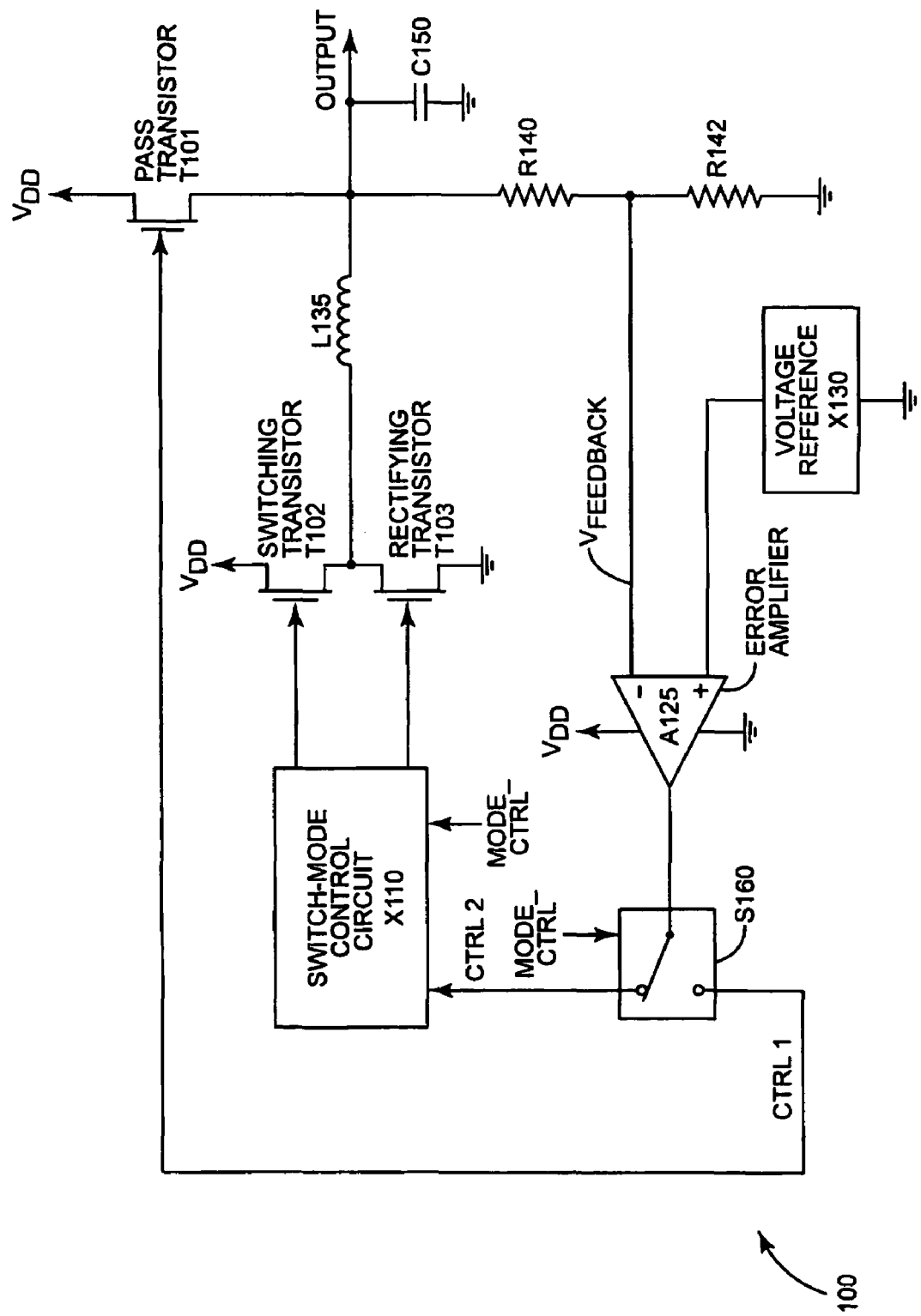
FIG. 1 is a schematic diagram of a multimode voltage regulator circuit according to some embodiments of the invention.

FIG. 1 illustrates an exemplary multimode voltage regulator circuit 100 according to some embodiments of the present invention. Multimode voltage regulator circuit 100 includes a linear regulator sub-circuit, which comprises pass transistor T101, configured to supply current from supply $V_{DD}$ to a load (at "OUTPUT"), under the control of a control signal CTRL1. As is well known to those skilled in the art, pass transistor T101 can be operated in its linear (or "ohmic") region as a variable-resistance device, thus effectively creating a voltage divider between the supply voltage $V_{DD}$ and ground, through the load. If the control signal CTRL1 is an error signal derived by comparing the output voltage to a reference voltage, as shown in FIG. 1, then the resistance of pass transistor T101 is continuously adjusted to maintain a substantially constant voltage at the load, despite changes in the load's current requirements or changes in the supply voltage $V_{DD}$. Capacitor C150, which in some embodiments may be external to an integrated circuit that includes the linear-regulator sub-circuit, smooths the output voltage. In some configurations, as will be appreciated by those skilled in the art, capacitor C150 may also provide compensation, for stabilizing the control loop of the linear-regulator. In these configurations, proper selection of the capacitor may be important, especially with respect to its equivalent series resistance (ESR).

Although the pass element is pictured in FIG. 1 as an n-channel field-effect transistor (FET), those skilled in the art will readily appreciate that other transistor types, including p-channel FETs and bipolar transistors, may also be used for the series pass element, although the circuit configuration for alternative devices will vary slightly from that shown. Indeed, although the linear regulator sub-circuit in FIG. 1 is a series-type linear regulator, those skilled in the art will appreciate that shunt-type linear regulators may also be used, although shunt regulators are typically less efficient than series regulators.

Multimode voltage regulator circuit 100 further comprises a switching regulator sub-circuit, comprising switching transistor T102, rectifying transistor T103, and switch-mode control circuit X110. The switch-mode control circuit X110 is responsive to control signal CTRL2. Coupled to the load through inductor L135, transistors T102 and T103 may be controlled to step down ("buck") the supply voltage $V_{DD}$ to the desired output voltage at the load. Again, various types of transistors may be used. Furthermore, rectifying transistor T103 may be replaced in some embodiments with a diode, although with some loss of efficiency.

Figure 5:
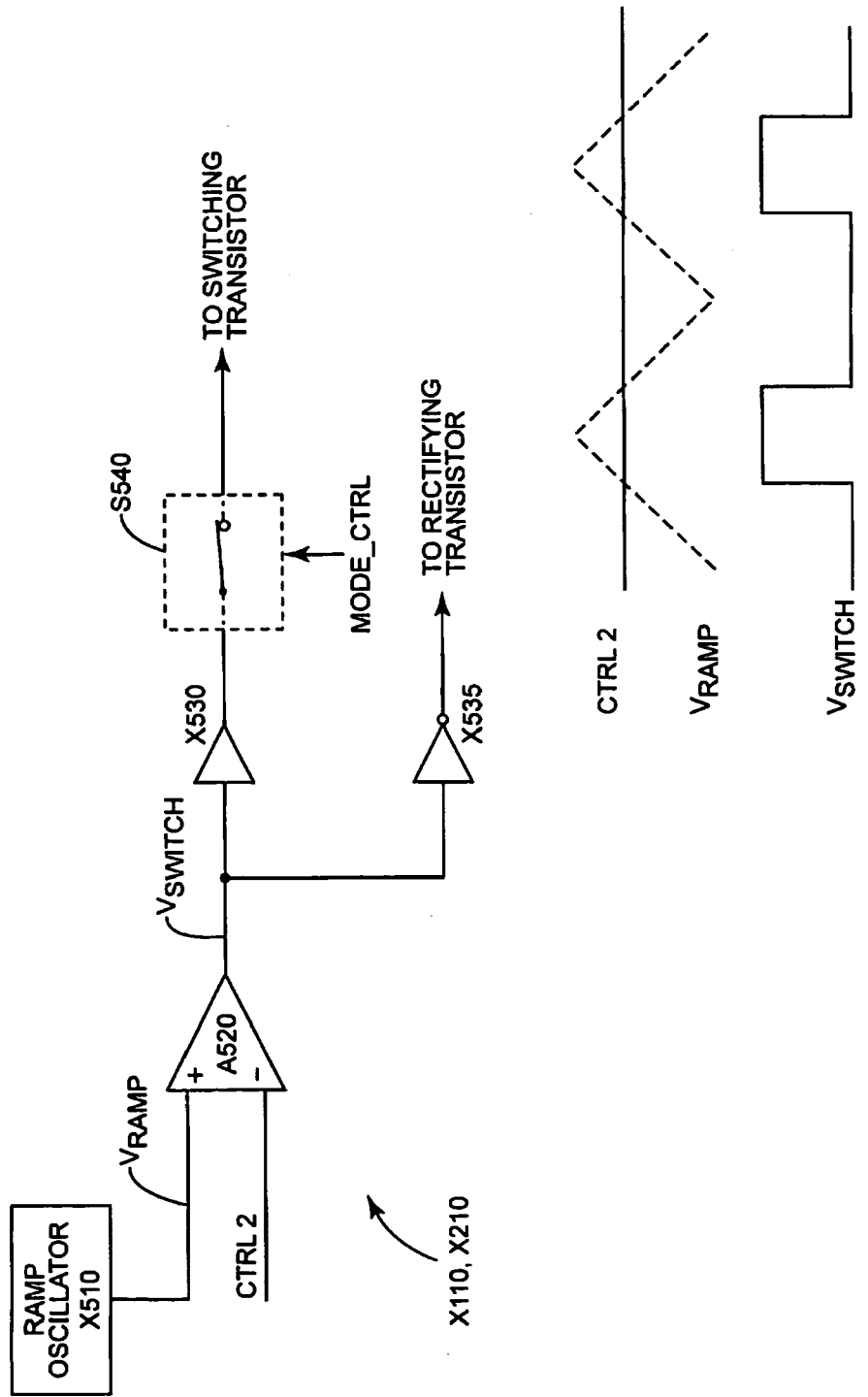
FIG. 5 is a schematic diagram illustrating an exemplary embodiment of a switch-mode control circuit.

Those skilled in the art are familiar with various means for controlling the transistors of a switching regulator. These include techniques based on pulse-width modulation (PWM), constant-on-time techniques, and so on. FIG. 5 provides a simplified schematic illustrating one possible embodiment of switch-mode control circuit X110, which in this case comprises a PWM controller. In the PWM controller of FIG. 5, ramp oscillator X510 produces a triangular waveform $V_{RAMP}$ at a constant frequency. (In various embodiments, the switching frequency may vary from a few tens of kilohertz to in excess of several megahertz. Wider ranges are of course possible.) Comparator A520 compares the $V_{RAMP}$ waveform to control signal CTRL2, which comprises an error signal derived from comparing the regulator output voltage to a fixed reference. When $V_{RAMP}$ exceeds CTRL2, the comparator output, $V_{SWITCH}$, goes high. Thus, a higher level for CTRL2 produces a lower on-time duty cycle for $V_{SWITCH}$, and vice-versa. $V_{SWITCH}$ is provided to drivers X530 and X535, which drive the switching transistor and rectifying transistor, respectively, in a complementary fashion.

Referring once more to FIG. 1, those skilled in the art will appreciate that the general operation of the switching regulator sub-circuit is the same, regardless of the control method employed. When switching transistor T102 is turned on, rectifying transistor T103 is turned off. Current thus flows from supply $V_{DD}$ to the output, through inductor L135, storing energy in the inductor L135. When switching transistor T102 is turned off, rectifying transistor T103 is turned on. In this "off" state, the energy in the inductor is discharged, and current flows from ground, through transistor T103, to the output. When the on- and off-times of switching transistor T102 and rectifying transistor T103 are properly controlled, responsive to a feedback signal derived from the regulator output, the steady-state average current through the inductor is constant, and the output voltage is maintained at a substantially constant level.

The linear regulator sub-circuit and switching regulator sub-circuit of multimode voltage regulator circuit 100 share several components. In particular, the regulator sub-circuits share error amplifier 125 and reference voltage X130. A feedback signal $V_{FEEDBACK}$ is derived from the regulator circuit output, through a resistive divider comprising resistors R140 and R142, and compared to a reference voltage supplied by voltage reference circuit X130, which may be, in some embodiments, a bandgap voltage reference. In low-current mode, i.e., when the load's current needs are below a predetermined threshold, the error signal produced by error amplifier A125 is routed, via switch S160, to the control path for the linear regulator sub-circuit. In high-current mode, i.e., when the load requires an operating current above the threshold, the error signal is instead routed to the control path for the switching regulator. Those skilled in the art will appreciate that components other than error amplifier A125 and voltage reference X130 may also be shared in some embodiments of the invention.

In many applications for multimode voltage reference circuit 100, a hardware control signal, such as the MODE_CTRL signal of FIG. 1, may be generated in response to an express determination (e.g., by a mobile phone's control processing logic) that a different operational mode has been entered or is about to be entered. For instance, a mobile phone's idle state, which comprises short, periodic, spurts of activity, separated by relatively long periods of inactivity, are typically triggered by a "wake-up" timer that runs during the mobile phone's "sleep" state. Each change in operating mode may include the activation of a MODE_CTRL signal, by a microprocessor, microcontroller, or other digital hardware, to reconfigure the voltage regulator circuit for the new operating mode. This signal may be the same as or linked to other control signals, such as a hardware signal that turns the phone's master clock on and off.

Figure 3:
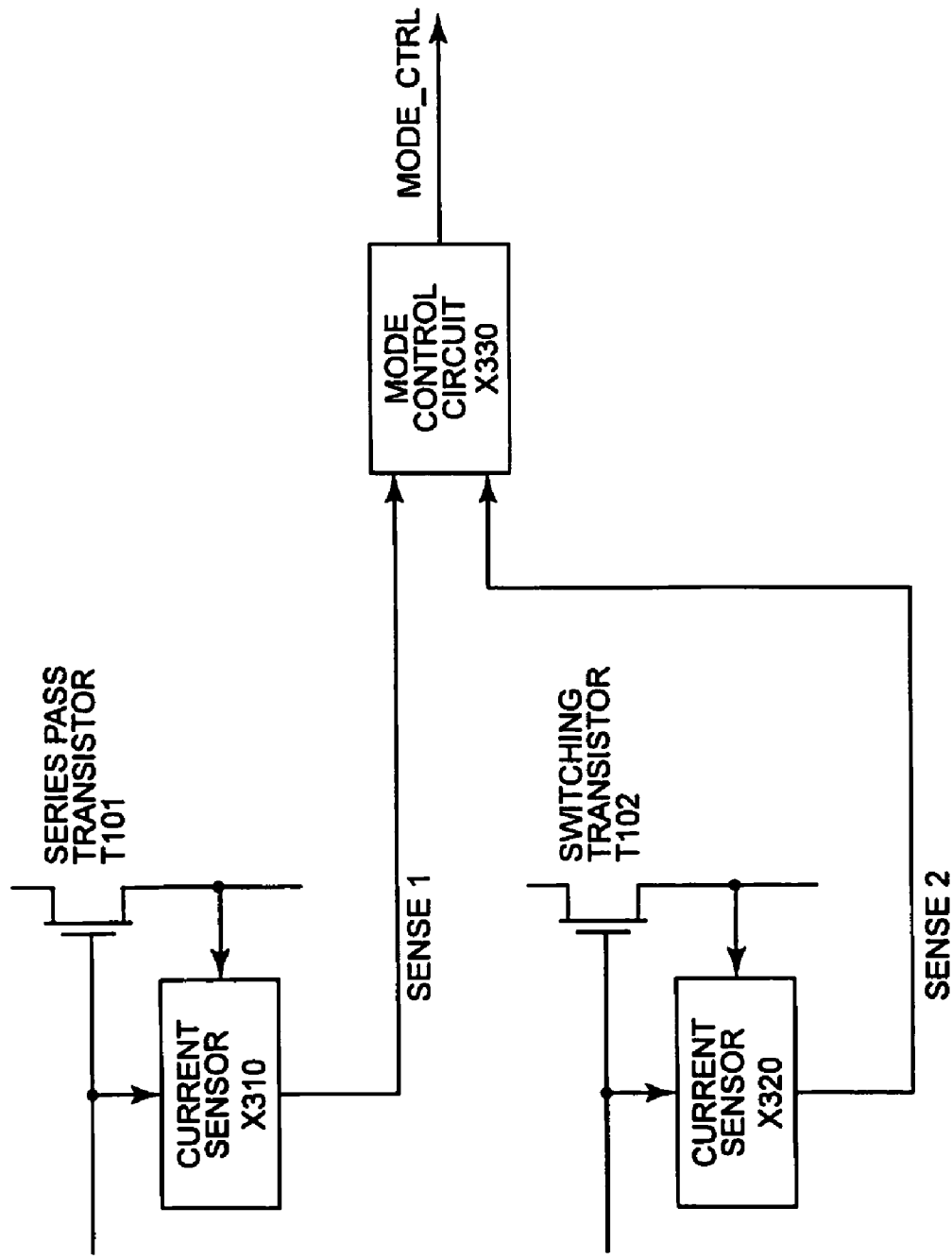
FIG. 3 is a schematic diagram illustrating a mode control circuit responsive to current sensor inputs.

For other applications, load current sensing or output voltage sensing may be used to switch the hybrid regulator between linear and switching modes. For instance, any of a number of conventional current-sensing schemes may be used to determine the current supplied by one or both of the regulators, or the total current supplied to the load. In some embodiments, a current sensor may be connected to each of the regulator sub-circuits, as shown in FIG. 3, where current sensor X310 monitors current flowing through series pass transistor T101 and current sensor X320 monitors current flowing through switching transistor T102. Those skilled in the art will appreciate that the current sensors X310 and X320 in FIG. 3 are connected in parallel with the transistors, thus avoiding any resistive voltage drop, and corresponding power loss, in the supply current path. One implementation of a current sensor in this configuration is a current mirror circuit, which effectively "copies" the transistor current under observation. Techniques for obtaining a scaled version of the current flowing through the target transistor (which is desirable in this context to minimize power consumption) are well known. For instance, some current mirrors may employ physically smaller transistors to scale the mirrored current. More complex techniques may be used to achieve larger scaling factors. See, for example, the circuits discussed in U.S. Pat. No. 4,947,103, issued Aug. 7, 1990, the entire contents of which are incorporated by reference herein.

Other current sensors may be connected in series with the measured current source, so that a voltage drop across a small series resistance can be measured to determine the magnitude of the current flow. However, the series resistance inherent in this type of sensor can reduce the regulator's overall efficiency, especially in high-current mode.

In any event, the output of current sensors X310 and X320 is provided to mode control circuit X330, which switches the regulator circuit between low-current and high-current modes, based on the detected current. In some embodiments, mode control circuit X330 may comprise a summing circuit, configured to add the SENSE1 and SENSE2 signals provided by current sensors X310 and X320. (SENSE1 and SENSE2 may be analog or digital signals, depending upon the implementation of sensors X310 and X320; the corresponding summing circuit will therefore be an analog or digital summing circuit as the case requires.) The sum of SENSE1 and SENSE2, which corresponds to the total current supplied to the load, is then compared to a pre-determined threshold level (again, using an analog or digital comparator, as the case requires) to determine the desired operating mode, and to set the level of control signal MODE_CTRL appropriately.

In some embodiments, mode control circuit X330 may be configured to apply hysteresis to the mode determination, to avoid repeated, frequent changes in mode when the required current level is close to the pre-determined threshold. Some embodiments may simply employ different thresholds for triggering changes from high-current to low-current mode and low-current to high mode; others may employ more complicated approaches. For instance, in one embodiment, control circuit X330 may be configured to switch the regulator circuit from high-current to low-current mode only when the detected load current falls below 5 mA, and from low-current to high-current mode when the detected current rises from below 1.2 mA to above 1.2 mA or in response to any upward change in the current when the detected current is between 5 mA and 1.2 mA.

Referring once more to FIG. 1, switch S160, which selectively routes the error signal from error amplifier A125 to the linear regulator control path and the switching regulator control path, is pictured as a single-pole, double-throw (SPDT) switch. Of course, there are a variety of ways to implement the switching function of switch S160; only some of those ways may actually closely resemble a SPDT switch configuration. For instance, in some embodiments the MODE_CTRL signal may be used to drive a pair of complementary transistors, to yield a true SPDT. In other embodiments the error signal may be routed to two buffer amplifier circuits, which are activated or deactivated in a complementary fashion by the MODE_CTRL signal. Those skilled in the art will recognize other possible implementations of the switching function provided in FIG. 1 by switch S160.

Those skilled in the art will appreciate that other switches or equivalent devices might be required, in some embodiments, to prevent undesired interaction between the low-current and high-current modes of operation, or to minimize power consumption. For instance, care should be taken to ensure that switching transistor T102 and rectifying transistor T103 are switched completely off during linear mode operation, to avoid wasting current or improper regulation of the output voltage. This may require the use of one or more additional switch elements, controlled by the MODE_CTRL signal, to switch transistors T102 and T103 to an off state during low-current mode. In some embodiments, all or part of switch-mode control circuit X110 might also be disabled during low-current mode, under the control of the MODE_CTRL signal, to minimize power consumption.

Figure 2:
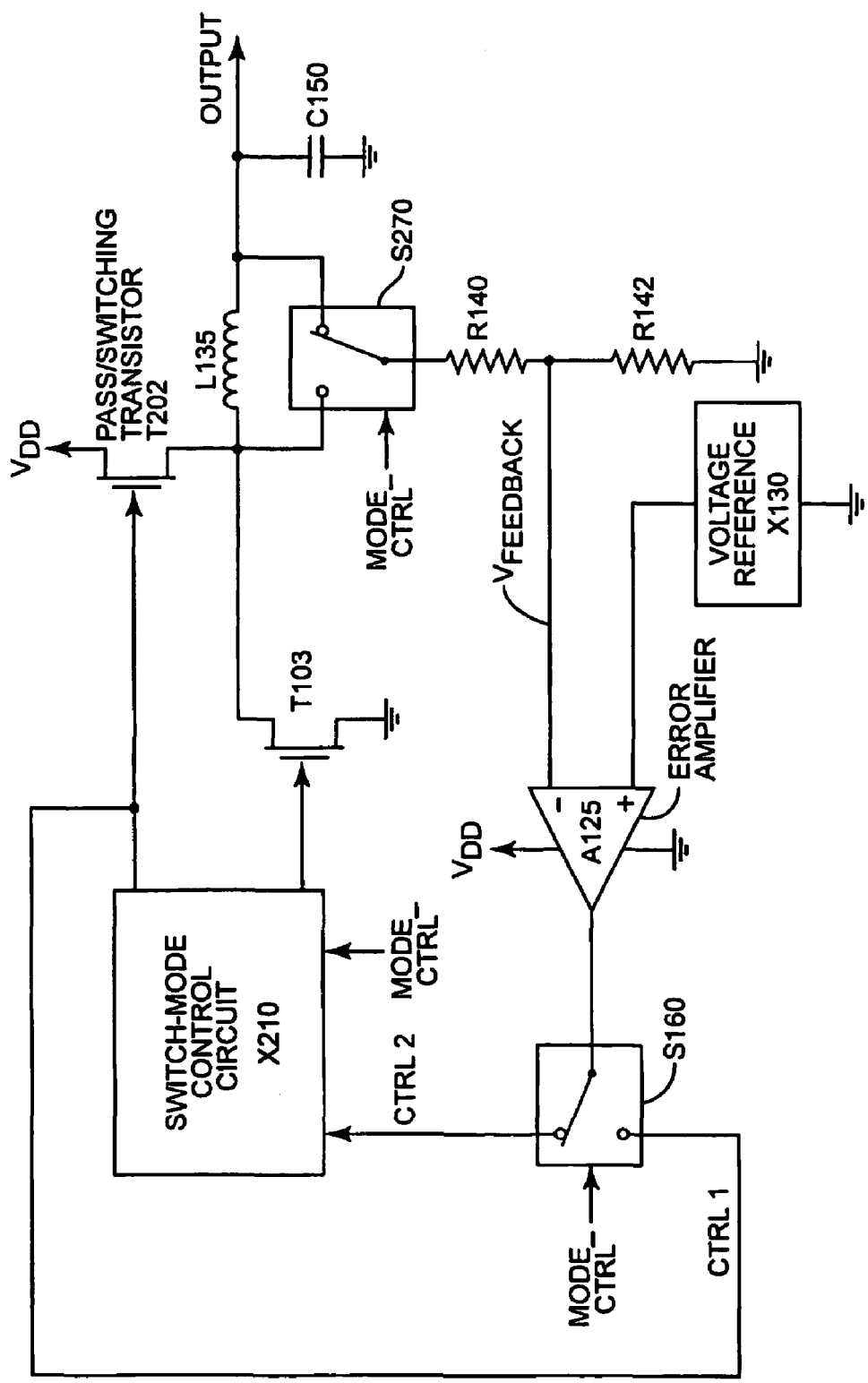
FIG. 2 is a schematic diagram illustrating another embodiment of a multimode voltage regulator circuit.

As noted earlier, components other than the error amplifier may also be shared in some embodiments of the present invention. FIG. 2 illustrates a multimode voltage regulator circuit 200 in which a transistor T202 is shared between the linear regulator sub-circuit and the switching regulator sub-circuit, transistor T202 acting as a variable-resistance pass transistor in the low-current mode and as a low-on-resistance switching transistor in the high-current mode. (Those skilled in the art will appreciate that a similar approach might be employed in embodiments employing a shunt-type linear regulator circuit; in these embodiments the shunt pass transistor may be combined with the rectifying transistor T103.) Such a configuration may be used to reduce the overall circuit size and/or cost, although those skilled in the art will appreciate that any savings in size or cost might be outweighed in some applications by difficulties in simultaneously optimizing the on-resistance, for switching mode operation, and leakage currents and/or control linearity, for linear mode operation. In some embodiments, such difficulties may be at least partially mitigated by employing a more complex transistor structure, such as a transistor with multiple gates.

Multimode regulator circuit 200 includes a switch S270, which selectively connects the feedback signal input of error amplifier A125 to the load (outside inductor L135), in high-current mode, and directly to the pass transistor T202 in low-current mode. This approach minimizes stability problems that might otherwise arise from the inclusion of inductor L135 in the control loop for the linear regulator sub-circuit. However, careful phase compensation of the linear-mode feedback loop might allow the output voltage sense point to remain at the output side of the inductor in both linear and buck regulator modes. In that case, switch S270 would not be needed. Phase compensation might include, for instance, the use of one or more capacitors at the output of the voltage regulator (such as C150) and/or the use of one or more capacitors in parallel with voltage divider resistors R140, R142, or both.

When a single transistor is shared between the linear regulator sub-circuit and switching regulator sub-circuit, care should be taken in the design of switch-mode control circuit X210 to ensure that the unused control loop is not configured in such a way as to impair operation of the selected mode. FIG. 5, for instance, illustrates an optional switch S540, which may be used to disconnect the output of driver X530 when the regulator circuit is in low-current mode. This ensures that the output impedance of driver X530 has no effect on the linear regulator control loop operation, and may further minimize wasted current. Of course, other techniques for isolating one control loop from the other may be employed. For instance, driver X530 may be configured to provide a high-impedance output when not in use.

Because the switching between linear and switching regulator modes is done only when the load current is low, avoiding transient output voltage glitches is straightforward. In some embodiments, changing the gain and/or the DC output level of the error amplifier during the transition may be sufficient. In many embodiments, a capacitor at the output of the regulator (such as C150) is sufficiently large that the load can be supported in low-current mode for a short time while the regulator switches modes and stabilizes. In these embodiments, a "soft startup" approach may be used when entering either mode. A soft startup circuit might comprise, in some embodiments, circuitry configured to ensure that the switching transistor begins in the off state, with a duty cycle of zero, upon entry into high-current mode. Similarly, soft startup circuitry may be configured to ensure that the series pass transistor is initialized at a high-resistance state upon entry into low-current mode. Soft startup circuitry may comprise logic and/or analog circuitry configured to change the gain of the shared error amplifier A125, in some embodiments, to adjust the feedback ratio, in some embodiments, and/or to temporarily disable or shift the output of error amplifier A125, in still other embodiments. Some of these embodiments may include the use of an RC time-constant to adjust the control loop response during a start-up period; in some instances the RC time-constant may be adjustable.

Either or both of multimode regulator circuits 100 and 200, as well as variations thereof, may be implemented with discrete devices, with one or more integrated circuits, or a combination thereof. In some embodiments, a monolithic integrated circuit or single package may comprise most of the elements described above, with only the inductor L135 and output capacitor C150 left "off-chip." In these embodiments, then, a monolithic integrated circuit may comprise a linear regulator sub-circuit configured to supply current to an external load in a low-current mode, responsive to a first control signal from a first control path and a switching regulator sub-circuit configured to supply current to the load in a high-current mode, responsive to a second control signal from a second control path. In these embodiments, the switching regulator sub-circuit may be configured to supply current to the load through an off-chip inductor L135. The monolithic integrated circuit may further comprise a shared error amplifier configured to generate an error signal based on the difference between a reference voltage and a feedback signal coupled from the load, as well as a switch configured to selectively route the error signal to the first control path in the low-current mode and to the second control path in the high-current mode. In some embodiments, the integrated circuit's linear regulator sub-circuit and switching regulator sub-circuit may be configured to share a transistor, as described above, so that the shared transistor operates as a variable-resistance pass transistor in the low-current mode and as a low-on-resistance switching transistor in the high-current mode. In these embodiments, current may be supplied to the external load through one or more shared terminals, thus potentially eliminating one or more terminals. Similarly, one or more package pins may be eliminated in implementations where the linear regulator sub-circuit and switching regulator sub-circuit share a transistor and are housed in a single package.

Figure 4:
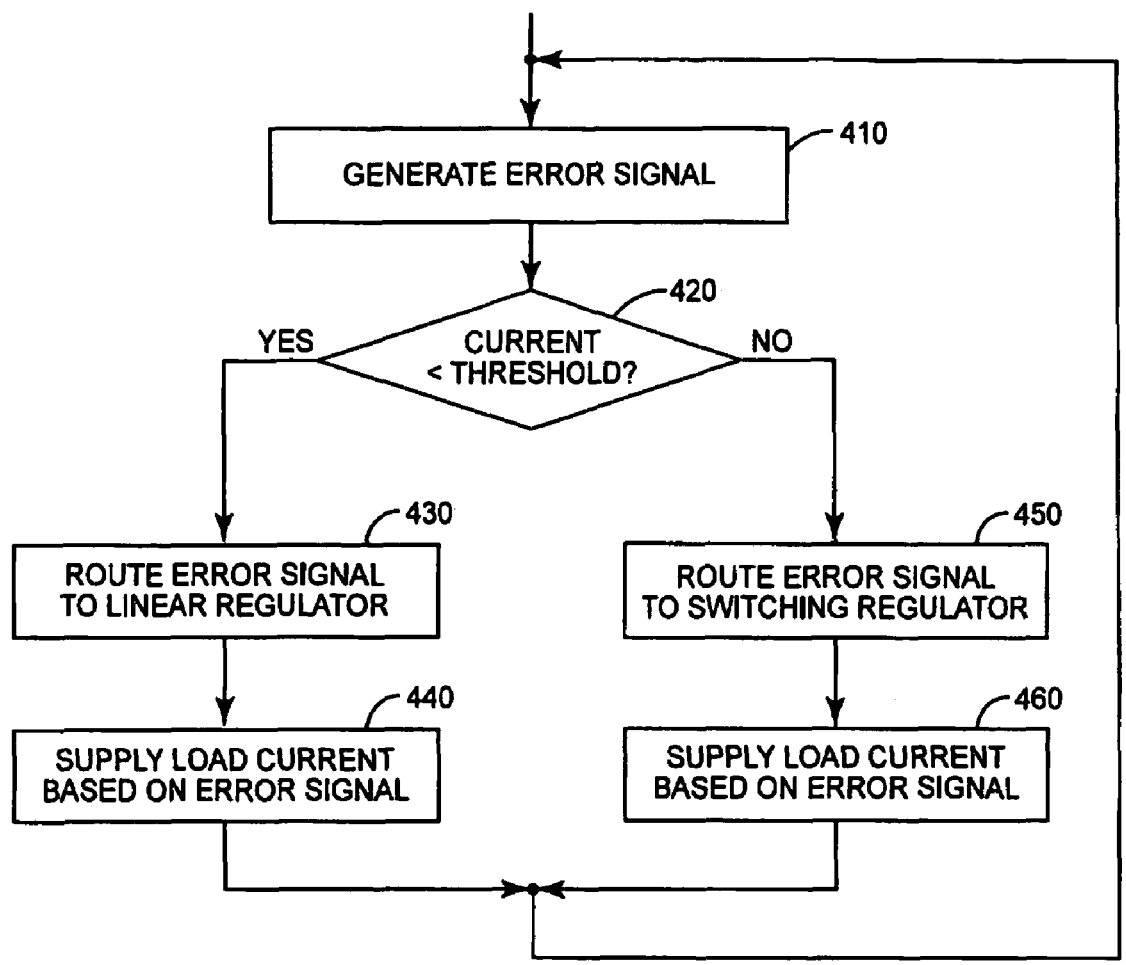
FIG. 4 is a process flow diagram illustrating a method for supplying current to a load according to some embodiments of the invention.

With the above exemplary circuits and their variants in mind, an exemplary method of supplying a current to a load, employing the inventive techniques of the present invention, is illustrated in the process flow diagram of FIG. 4. In the pictured method, the transitions between low-current and high-current modes are triggered by the detected current—those skilled in the art will appreciate that a nearly identical process may be employed in embodiments where a mode change is signaled by processing logic.

In any event, the pictured process flow of FIG. 4 "begins" at block 410, with the generation of an error signal, although those skilled in the art will appreciate that several of the pictured "steps" may actually refer to operations that are ongoing during the entire process. Others may be performed continuously during a particular mode.

Thus, for example, the error signal generation of block 410, which may be performed in some embodiments by comparing a feedback signal derived from a regulator output to a reference voltage, may be performed continuously, in some embodiments. Similarly, block 420 illustrates the comparison of the load current to a threshold value—this operation might also be performed continuously, in some embodiments.

If the current is less than the threshold, the process begins (or continues in) a low-current mode. Thus, the error signal is routed to a linear regulator sub-circuit, as shown at block 430, and the load current is supplied by the linear regulator, responsive to the error signal, as shown at block 440. Operation in low-current mode continues until the detected current exceeds the pre-determined threshold (at block 420), at which time operation switches to high-current mode. The error signal is routed to a switching regulator sub-circuit, as shown at block 450, and current is supplied to the load, responsive to the error signal, by the switching regulator. Operation in high-current mode continues until a mode change occurs, triggered by a change in current detected at block 420

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A multimode voltage regulator circuit comprising:
   a linear regulator sub-circuit configured to supply current to a load in a low-current mode, responsive to a first control signal from a first control path;
   a switching regulator sub-circuit configured to supply current to the load in a high-current mode, responsive to a second control signal from a second control path;
   a shared error amplifier configured to generate an error signal based on the difference between a reference voltage and a feedback signal coupled from the load; and
   a switch configured to selectively route the error signal to the first control path in the low-current mode and to the second control path in the high-current mode.

2. The multimode voltage regulator circuit of claim 1, wherein the linear regulator sub-circuit and the switching regulator sub-circuit share a transistor, said transistor configured to operate as a variable-resistance pass transistor in the low-current mode and as a low-on-resistance switching transistor in the high-current mode.

3. The multimode voltage regulator circuit of claim 2, wherein the feedback signal is obtained from a resistive divider network coupled to the load.

4. The multimode voltage regulator circuit of claim 2, wherein the feedback signal is obtained from a resistive divider network selectively coupled to the output of said transistor in the low-current mode and to the load in the high-current mode.

5. The multimode voltage regulator circuit of claim 1, further comprising a current sensor sub-circuit configured to detect the current supplied to the load and to switch the regulator circuit between the low-current and high-current modes based on the detected current.

6. The multimode voltage regulator circuit of claim , wherein at least the linear regulator sub-circuit and the switching regulator sub-circuit are integrated into a monolithic integrated circuit.

7. The multimode voltage regulator circuit of claim 6, wherein the linear regulator sub-circuit and the switching regulator sub-circuit share a transistor, said transistor configured to operate as a variable-resistance pass transistor in the low-current mode and as a low-on-resistance switching transistor in the high-current mode, and wherein the linear regulator sub-circuit and the switching regulator sub-circuit supply current to the external load through one or more shared terminals of the monolithic integrated circuit.

8. The multimode voltage regulator circuit of claim 1, wherein at least the linear regulator sub-circuit and the switching regulator sub-circuit are housed in a single package.

9. The multimode voltage regulator circuit of claim 8, wherein the linear regulator sub-circuit and the switching regulator sub-circuit share a transistor, said transistor configured to operate as a variable-resistance pass transistor in the low-current mode and as a low-on-resistance switching transistor in the high-current mode, and wherein the linear regulator sub-circuit and the switching regulator sub-circuit supply current to the external load through one or more shared terminals of the single package.

10. A method of supplying current to a load, the method comprising:
supplying current to the load with a linear regulator in a low-current mode, responsive to a first control signal;
supplying current to the load with a switching regulator in a high-current mode, responsive to a second control signal;
generating an error signal, using a shared error amplifier, based on the difference between a reference voltage and a feedback signal coupled from the load; and
selectively switching the error signal to the linear regulator in the low-current mode, for use as the first control signal, and to the switching regulator in the high-current mode, for use as the second control signal.

11. The method of claim 10, wherein the linear regulator sub-circuit and the switching regulator sub-circuit share a transistor, said transistor configured to operate as a variable-resistance pass transistor in the low-current mode and as a low-on-resistance switching transistor in the high-current mode.

12. The method of claim 11, further comprising obtaining the feedback signal from a resistive divider network coupled to the load.

13. The method of claim 11, further comprising obtaining the feedback signal from a resistive divider network selectively coupled to the output of said transistor in the low-current mode and to the load in the high-current mode.

14. The method of claim 10, further comprising:
detecting the current supplied to the load; and
switching the regulator circuit between the low-current and high-current modes based on the detected current.

* * * * *

UNITED STATES PATENT AND TRADEMARK OFFICE
CERTIFICATE OF CORRECTION

| | | |
|---|---|---|
| PATENT NO. | : 7,990,119 B2 | Page 1 of 1 |
| APPLICATION NO. | : 12/181739 | |
| DATED | : August 2, 2011 | |
| INVENTOR(S) | : Petty | |

It is certified that error appears in the above-identified patent and that said Letters Patent is hereby corrected as shown below:

In Column 9, Line 11, in Claim 6, delete "claim ," and insert -- claim 1, --, therefor.

Signed and Sealed this
Twentieth Day of December, 2011

David J. Kappos
*Director of the United States Patent and Trademark Office*